(12) United States Patent
Shimozato

(10) Patent No.: US 7,595,961 B2
(45) Date of Patent: Sep. 29, 2009

(54) BASE MEMBER AND INFORMATION STORAGE APPARATUS

(75) Inventor: Toru Shimozato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 11/018,537

(22) Filed: Dec. 21, 2004

(65) Prior Publication Data

US 2006/0044693 A1    Mar. 2, 2006

(30) Foreign Application Priority Data

Aug. 31, 2004    (JP) ............................. 2004-253165

(51) Int. Cl.
G11B 21/16    (2006.01)
(52) U.S. Cl. ................. 360/244.6; 360/244.5
(58) Field of Classification Search .............. 360/244.5, 360/244.6, 244.7
See application file for complete search history.

(56) References Cited

U.S. PATENT DOCUMENTS

| | | | | |
|---|---|---|---|---|
| 5,444,587 | A * | 8/1995 | Johnson et al. | 360/245.2 |
| 6,198,602 | B1 * | 3/2001 | Vera et al. | 360/244.5 |
| 6,757,136 | B2 * | 6/2004 | Buske et al. | 360/244.5 |
| 7,164,559 | B2 * | 1/2007 | Yamamoto et al. | 360/265.9 |
| 2001/0050833 | A1 * | 12/2001 | Murphy et al. | 360/294.4 |
| 2002/0051318 | A1 * | 5/2002 | Kant et al. | 360/244.6 |
| 2002/0181161 | A1 * | 12/2002 | Buske et al. | 360/266.3 |

FOREIGN PATENT DOCUMENTS

| | | |
|---|---|---|
| JP | 55-001195 | 1/1980 |
| JP | 62-298012 | 12/1987 |
| JP | 2001-353539 | 12/2001 |

* cited by examiner

Primary Examiner—Tianjie Chen
(74) Attorney, Agent, or Firm—Greer, Burns & Crain, Ltd.

(57) ABSTRACT

In an information storage apparatus, a relatively thin attachment member has a cylindrical boss section projecting from a surface thereof and a path passing through the attachment member and reaching the extreme end of the boss section and is attached to a relatively thick base member. The base member has a through hole which passes therethrough in the thickness direction thereof and into which the boss section is inserted. The attachment member is caulked to the base member by plastically deforming the boss section by causing a caulking ball whose diameter is larger than that of the path to pass therethrough in the state that the boss section is inserted into the through hole. The through hole has an escape section into which a part of the plastically deformed boss section escapes, thereby a large amount of plastic deformation of the boss section can be suppressed.

7 Claims, 10 Drawing Sheets

BASE MEMBER AND INFORMATION STORAGE APPARATUS

BACKGROUND OF THE INVENTION

1. Field of the Invention

The present invention relates to a relatively thick base member to which an attachment member is attached and to an information storage apparatus having the base member as a carriage arm, the attachment member being composed of a relatively thin sheet member having a cylindrical boss section that projects from a surface of the sheet member and a path that passes through the sheet member and reaches the extreme end of the boss section.

2. Description of the Related Art

In an information storage apparatus, a carriage arm, which moves along a surface of a magnetic disc by receiving a drive force from an actuator, is ordinarily connected to a suspension arm through a spacer, the suspension arm having a magnetic head at the extreme end thereof that executes at least any one of recording and reproducing of information to and from a magnetic disc. When the carriage arm is connected to the suspension arm through the spacer, the suspension arm is attached to, for example, an end of the spacer by laser welding and the like, and the other end of the spacer is attached to the carriage arm. Heretofore, it is known to caulk one member to the other member as a method of strongly connecting the two members (refer to, for example, Japanese Patent Application Publication No. H55-1195). Further, the spacer is attached to the carriage arm by being caulked thereto (refer to, for example, Japanese Patent Application Publication No. 2001-353539). The technique disclosed in Japanese Patent Application Publication No. 2001-353539 employs a spacer having a cylindrical boss section projecting from a surface of a sheet member. The spacer disclosed in Japanese Patent Application Publication No. 2001-353539 has a path that passes through the sheet member and reaches the extreme end of the boss section. In contrast, the carriage arm disclosed in Japanese Patent Application Publication No. 2001-353539 has a through hole passing through the carriage arm in a thickness direction. Japanese Patent Application Publication No. 2001-353539 discloses a so-called ball caulking technique. According to the technique, the boss section is plastically deformed by causing a spherical body (ball) whose diameter is larger than that of the path to pass therethrough in the state that the boss section of the spacer is inserted into the through hole of the carriage arm, thereby the spacer is caulked to the carriage arm.

Incidentally, when the boss section is plastically deformed by a large amount in the passing-through direction of the spherical body, the sheet member is also pulled in the passing-through direction of the spherical body. Accordingly, there is a possibility that the suspension arm attached to the spacer inclines and the extreme end thereof is raised. To cope with the problem, the technique disclosed in Japanese Patent Application Publication No. 2001-353539 gives an ingenious idea to the spacer to suppress the large amount of plastic deformation of the boss section in the passing-through direction of the spherical body. That is, the plastic deformation of the boss section is suppressed by forming a hole in the vicinity of the boss section of the sheet member or by cutting out a part of the peripheral wall of the projecting boss section in a projecting direction.

However, since the thickness of the sheet member of the spacer is greatly smaller than that of the carriage arm, when the hole disclosed in Japanese Patent Application Laid-Ope No. 2001-353539 is formed, the strength of the spacer is lowered. Further, the strength of the boss section itself is lowered by the cut-out formed to the boss section. Accordingly, the spacer must be handled with extra caution to prevent the spacer from bending when it is assembled or to prevent breakdown of the boss section. Therefore a problem arises in that the handling property of the spacer is deteriorated.

This problem is not specific to the spacer attached to the carriage arm but is common to an attachment member attached to a base member. Accordingly, there is a requirement for a technique that can suppress a large amount of plastic deformation of a boss section in the passing-through direction of a spherical body on the side of a base member whose thickness is larger than that of a sheet member of a spacer.

SUMMARY OF THE INVENTION

The present invention has been made in view of the above circumstances and provides a base member that can suppress a large amount of plastic deformation of a boss section in a passing-through direction of a spherical body and an information storage apparatus having the base member as a carriage arm.

In a base member having a relatively large thickness of the present invention to which an attachment member is attached, the attachment member includes a relatively thin sheet member which has a cylindrical boss section projecting from a surface of the sheet member and which has a path passing through the sheet member and reaching the extreme end of the boss section. The base member includes a through hole which passes therethrough in the thickness direction thereof and into which the boss section is inserted. The attachment member is caulked to the base member by plastically deforming the boss section by causing a spherical body whose diameter is larger than that of the path to pass through the path in the state that the boss section is inserted into the through hole. The through hole has an escape section into which a part of the boss section escapes in radial direction of the path when the attachment member is caulked to the base member.

According to the base member of the present invention, since the through hole has the escape section, it can be suppressed that the boss section is plastically deformed in the passing-through direction of the spherical body for lack of an escaping place.

It is preferable in the base member of the present invention that the through hole be a hole having such a shape that a large circle whose diameter corresponds to the outside diameter of the boss section overlaps a small circle whose diameter is smaller than that of the large circle so that the arc of the large circle intersects the arc of the small circle and that the portion of the small circle which is located outside of the large circle act as an escape section.

With the above arrangement, the escape section is delimited by an arc-shaped wall, thereby the strength of the escape section is increased.

The through hole may be an elliptic hole, and both the ends of the elliptic through hole in the major axis direction thereof may act as escape sections.

The base member of the present invention is a carriage arm whose extreme end turns along a surface of a predetermined information storage medium using the rear end thereof as a fulcrum by receiving a drive force from an actuator, and the attachment member is a spacer to one end of which the rear end of a suspension arm is attached in the lengthwise direction of the spacer and the other end of the spacer is attached to the extreme end of the carriage arm, the suspension arm having a magnetic head disposed at the extreme end thereof to execute at least any one of recording and reproducing of information to and from the predetermined information storage medium.

When the base member is the carriage arm and the attachment member is the spacer, it is preferable that the through hole has a projecting space projecting from the circle whose diameter corresponds to the outside diameter of the boss section toward the extreme end of the carriage arm and that the projecting space acts as the escape section.

With the above arrangement, it can be securely suppressed that one end of the sheet member acting as the spacer is pulled in the passing-through direction of the spherical body. As a result, it can be prevented that the suspension arm attached to the one end of the sheet member in the lengthwise direction inclines and the extreme end thereof is raised.

In this case, the through hole may be an elliptic hole whose major axis direction is in agreement with the lengthwise direction of the spacer attached to the carriage arm, and both the sides of the elliptic hole in the major axis direction thereof may act as the escape sections.

An information storage medium of the present invention includes a magnetic head that executes at least any one of recording and reproducing of information to and from a predetermined information storage medium, a suspension arm that holds the magnetic head such that the magnetic head approaches or comes into contact with the information storage medium, a carriage arm that moves along a surface of the information storage medium by receiving a drive force from an actuator, a spacer whose one end is attached to the suspension arm as well as the other end thereof is attached to the carriage arm, the spacer having a cylindrical boss section projecting from a surface of a sheet member whose thickness is smaller than that of the carriage arm and having a path passing through the sheet member and reaching the extreme end of the boss section, wherein the carriage arm has a through hole which passes therethrough in the thickness direction thereof and into which the boss section is inserted, when the spacer is attached to the carriage arm, the spacer is caulked to the carriage arm by plastically deforming the boss section by causing a spherical body whose diameter is larger than that of the path to pass through the path in the state that the boss section is inserted into the through hole, and the through hole has an escape section into which a part of the plastically deformed boss section escapes in the radial direction of the path when the spacer is caulked to the carriage arm.

According to the present invention, there can be provided the base member that can suppress a large amount of plastic deformation of the boss section in the passing-through direction of the spherical body and the information storage apparatus having the base member.

DETAILED DESCRIPTION OF THE INVENTION

An Embodiment of the present invention will be explained below with reference to the drawings.

Figure 1:
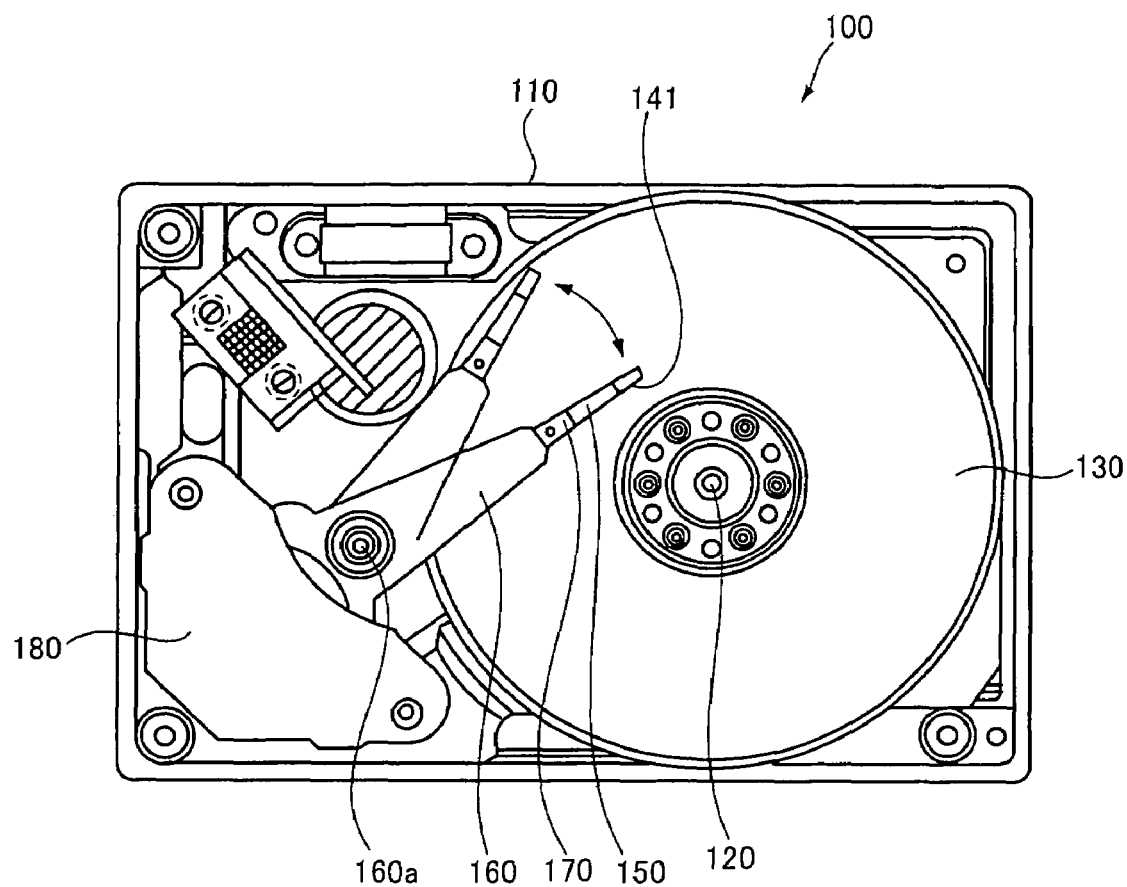
FIG. 1 is a view showing a hard disc drive as an embodiment of an information storage apparatus according to the present invention.

FIG. 1 is a view showing a hard disc drive as an embodiment of an information storage apparatus according to the present invention.

The hard disc drive 100 shown in FIG. 1 has a magnetic disc 130 mounted on a rotary shaft 120 and rotated thereby, a magnetic head 141 that records and reproduce information to and from the magnetic disc 130, and a suspension arm 150 having the magnetic head 141 disposed at the extreme end thereof, and these components are accommodated in a housing 110 of the hard disc drive 100. The magnetic head 141 is mounted on a slider and disposed to the suspension arm 150. Further, a carriage arm 160 and an actuator 180, which drives the carriage arm 160, are also accommodated in the housing 110, the extreme end of the carriage arm 160 turning along a surface of the magnetic disc 130 about the rear end thereof acting as a fulcrum 160a. The suspension arm 150 is connected to the carriage arm 160 through a spacer 170, and when the carriage arm 160 turns, the magnetic head 141 moves on the surface of the magnetic disc 130 as shown by an arrow in FIG. 1. Note that an internal space of the housing 110 is sealed with a cover (not shown).

In the hard disc drive 100 of the embodiment, a plurality of magnetic discs 130 are mounted on the rotary shaft 120, and each magnetic disc 130 is provided with the suspension arm 150 having the magnetic head 141 disposed at the extreme end thereof.

Figure 2:
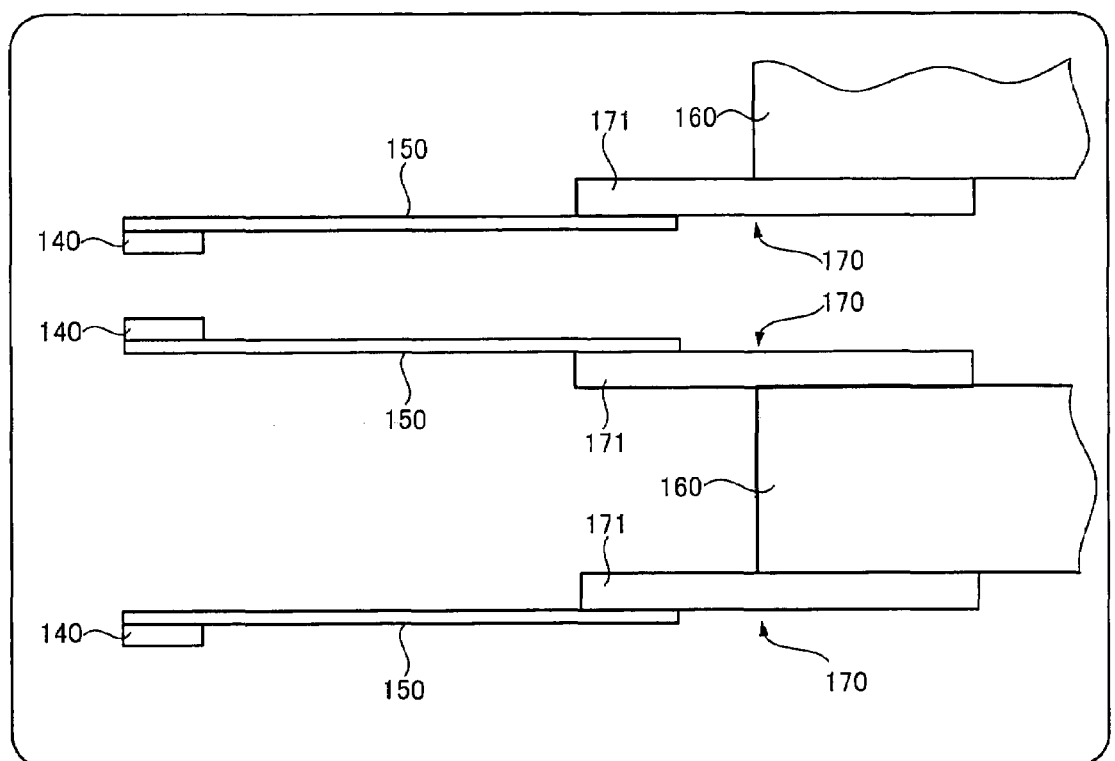
FIG. 2 is a schematic view showing how suspension arms are connected to carriage arms through spacers when they are viewed from a side.

FIG. 2 is a schematic view showing how suspension arms are connected to carriage arms through spacers when they are viewed from a side.

FIG. 2 shows the three suspension arms 150, and the sliders 140 on which the magnetic heads are mounted are held at the extreme ends of the suspension arms 150. Two suspension arms 150 are attached to one carriage arm 160 through the two spacers 170 so that the extreme ends of the carriage arm 160 are clamped by the two spacers 170. The spacers 170 are composed of sheet members 171 whose thickness is smaller than the carriage arm 160 and larger than the suspension arms 150. The rear end of each suspension arm 150 is laser welded to an end of each sheet member 171 in the lengthwise direction thereof (left end in FIG. 2). Further, the extreme end of each carriage arm 160 is attached to the other end of each sheet member 171 in the lengthwise direction thereof (right end in FIG. 2). The sheet members 171 are in contact with the carriage arms 160 on the surfaces thereof opposite the surfaces thereof to which the suspension arms 150 are attached.

When information is recorded to the magnetic discs 130 shown in FIG. 1 and when information recorded on the magnetic discs 130 is reproduced, the carriage arms 160 are driven by actuators 180 each composed of a magnetic circuit, and the sliders 140 are driven by piezo actuators (not shown), thereby the magnetic heads 141 mounted on the sliders 140 are positioned in desired tracks on the magnetic discs 130 being rotated. As the magnetic discs 130 are rotated, the magnetic heads 141 sequentially approach respective minute regions disposed on the respective tracks of the magnetic discs 130. When information is recorded, electric recording signals are input to the magnetic heads 141 that approach the magnetic discs 130 as described above, magnetic fields are applied to the respective minute regions by the magnetic heads 141 in response to the recording signals, and the information carried by the recording signals is recorded as the magnetizing directions of the respective minute regions. Further, when information is reproduced, the information recorded as the magnetizing directions of the respective minute regions is fetched as reproduced electric signals in response to the magnetic fields generated by the magnetized head 141.

Next, how the spacers 170 are attached to the carriage arm 160 will be explained.

Figure 3:
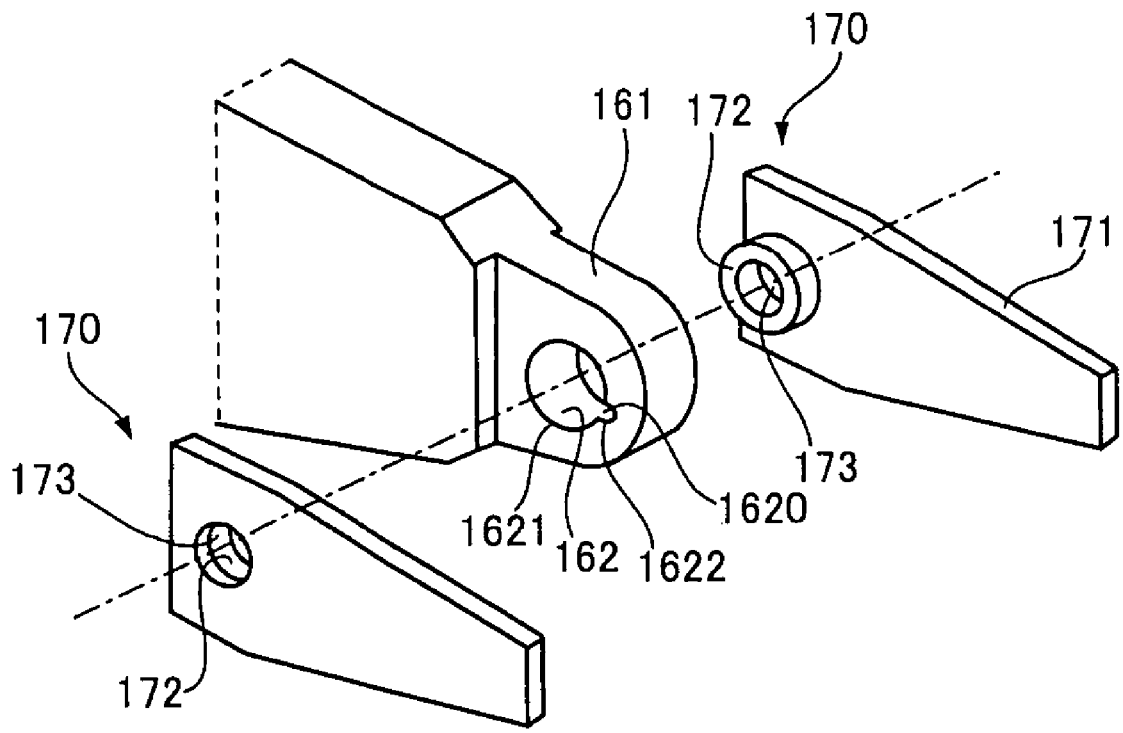
FIG. 3 is a view showing how two spacers are set to a carriage arm.

FIG. 3 is a view showing how the two spacers are set to the carriage arm.

Each of the sheet members 171 constituting the spacers 170 shown in FIG. 3 is formed in such a slender shape that its width is gradually reduced toward an extreme end. The sheet member 171 has a cylindrical boss section 172 at the rear end thereof which projects from a surface of the sheet member 171. Each spacer 170 shown in FIG. 3 is provided with a path 173 that passes through the sheet member 171 and reaches the extreme end of the boss section 172.

In contrast, a through hole 162 is formed to the carriage arm 160 shown in FIG. 3 at an extreme end 161 thereof, the through hole 162 passing through the carriage arm 160 in the thickness direction thereof. The through hole 162 is formed in such a shape that a large circle 1621 whose diameter is slightly larger than the outside diameter of the cylindrical boss section 172 overlaps a small circle 1622 whose diameter is greatly smaller than that of the large circle 1621 so that the arc of the large circle 1621 intersects the arc of the small circle 1622. The through hole 162 shown in FIG. 3 has a projecting space 1620 projecting toward the extreme end of the carriage arm 160. The projecting space 1620 is equivalent to the space of the portion of the small circle 1622 which is located outside of the large circle 1621. Accordingly, a wall, which delimits the projecting space 1620, is formed in an arc shape, and thus the projecting space 1620 is very strong. Note that the wall may be formed in a linear shape.

The two spacers 170 are set to the carriage arm 160 in such a manner that the respective boss sections 172 are inserted into the through hole 162 so as to clamp the extreme end of the carriage arm 160 in the thickness direction thereof.

Figure 4:
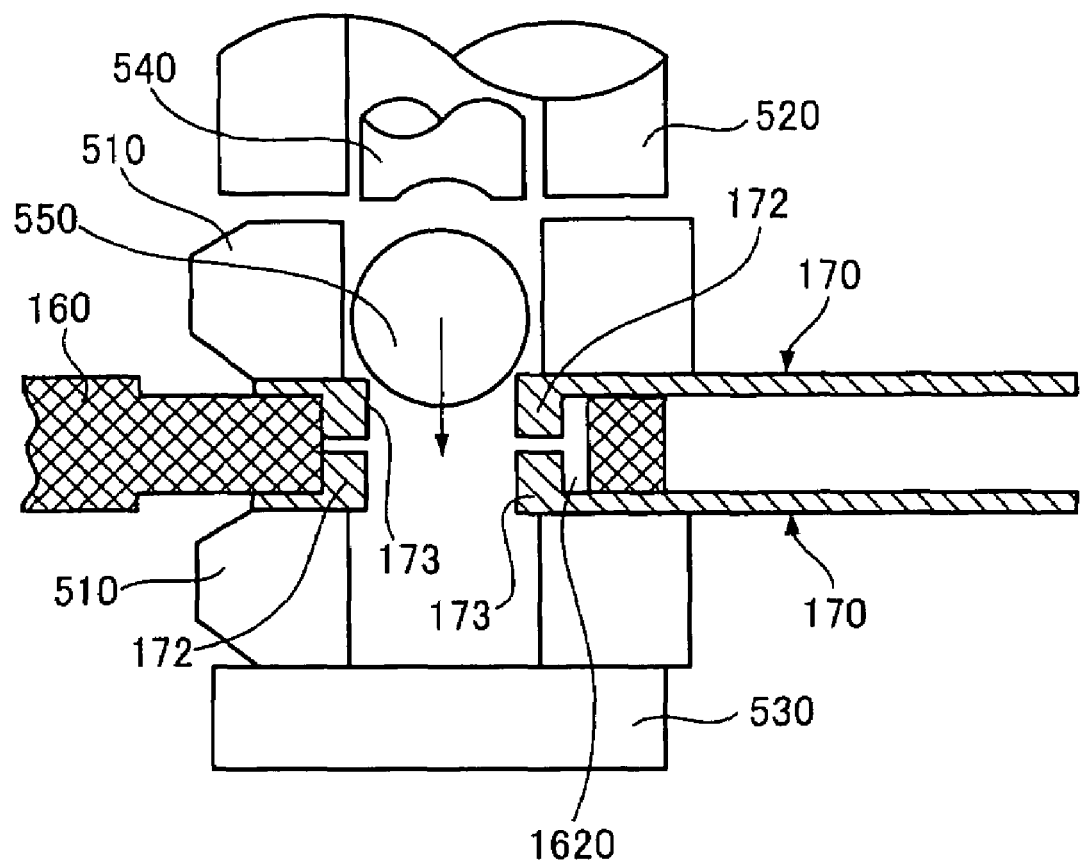
FIG. 4 is a view showing how the two spacers, which are set to the carriage arm, are secured to the carriage arm.

FIG. 4 is a view showing how the two spacers 170 set to the carriage arm 160 are secured to the carriage arm 160.

First, the carriage arm 160, to which the two spacers 170 are set, is interposed between a press clamp 520 shown above in FIG. 4 and a press clamp receiver 530 shown below in FIG. 4 in the state that the carriage arm 160 is clamped therebetween in the thickness direction thereof through wedges 510. Subsequently, the carriage arm 160 and the spacers 170 are pressed by the press clamp 520 so that a caulking ball 550 composed of a bearing ball as a spherical body is pushed downward by a caulking pin 540 and caused to pass through the paths 173 formed to the spacers 170. The caulking ball 550 is composed of the spherical body having a diameter larger than that of the paths 173 of the spacers 170, and the boss sections 172 of the spacers 170 are plastically deformed by the caulking ball 550 passing though the paths 173, thereby the spacers 170 are caulked to the carriage arm 160. FIG. 4 also shows the projecting space 1620 formed to the through hole 162.

Next, a force, which applied to the boss sections 172 when the spacers 170 are caulked to the carriage arm 160 having the through hole 162 to which the projecting space 1620 is formed, will be explained. First, an example that the spacers 170 are caulked to a carriage arm 160 having a through hole without the projecting space 1620 will be explained. In the example, the same components as those explained up to now are denoted by the same reference numerals.

Figure 5:
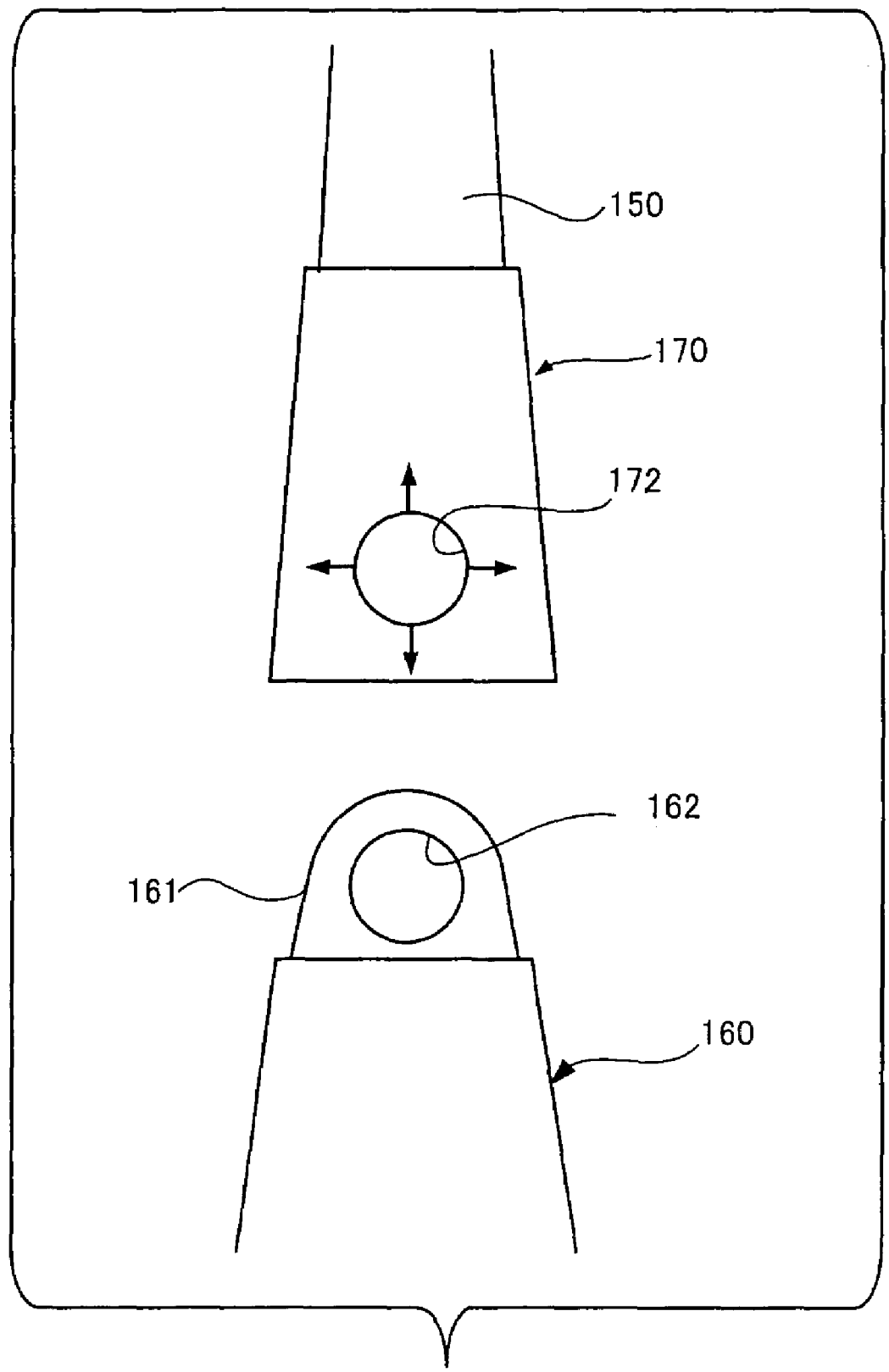
FIG. 5 is a view schematically showing a carriage arm having a through hole without a projecting space, and a spacer shown in FIG. 3.

FIG. 5 is a schematic view showing the carriage arm having the through hole without the projecting space, and a spacer shown in FIG. 3.

A through hole 162 is formed to the extreme end 161 of the carriage arm 160 shown in FIG. 5, the through hole 162 being formed in a circle (large circle 1621 shown in FIG. 3) whose diameter is slightly larger than the outside diameter of a boss section 172 disposed to the rear end of the spacer 170. Note that a suspension arm 150 is attached to the extreme end of the spacer 170. When the spacer 170 is caulked to the carriage arm 160 shown in FIG. 5, a force is radially uniformly applied to the boss section 172 (refer to arrows in FIG. 5).

Figure 6:
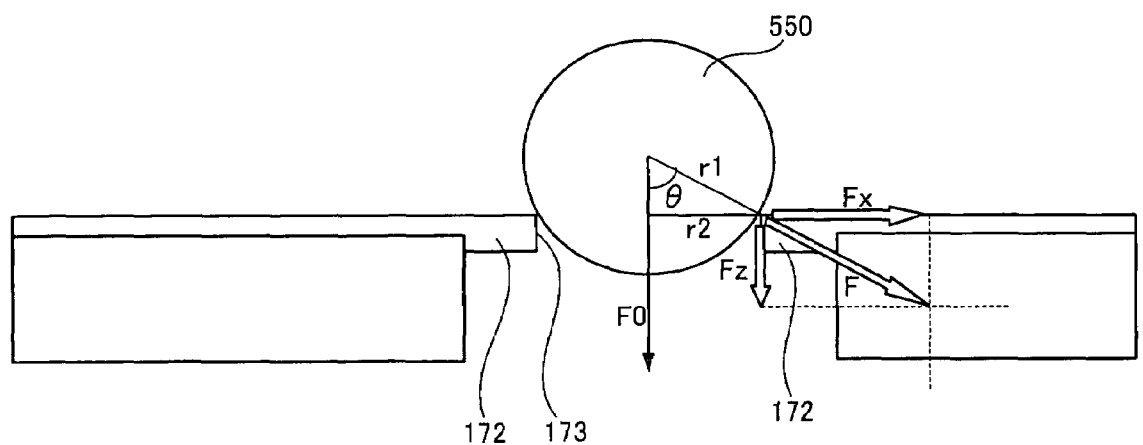
FIG. 6 is a view analyzing the vectors of a force applied to a boss section when a spacer is caulked to the carriage arm shown in FIG. 5.

FIG. 6 is a view analyzing the vectors of the force applied to the boss section when the spacer is caulked to the carriage arm shown in FIG. 5.

When the force of the caulking pin 540 which pushes the caulking ball 550 is shown by F0, a force F, which is received from the caulking ball 550 by the boss section 172 when the caulking ball 550 passes through a path, is shown by $F=F0 \times \cos\theta$. When the radius of the caulking ball 550 is shown by r1, and the radius of the path 173 is shown by r2, $\sin\theta = r2/r1$, derived from which is $\cos\theta = (r1^2 - r2^2)^{1/2}/r1$.

Further, a force Fz of the caulking ball 550 applied to the boss section 172 in a passing-through direction is shown by Expression 1.

$$Fz = F \times \cos\theta = F0 \times \cos^2\theta \quad \text{Expression 1}$$

Figure 7:
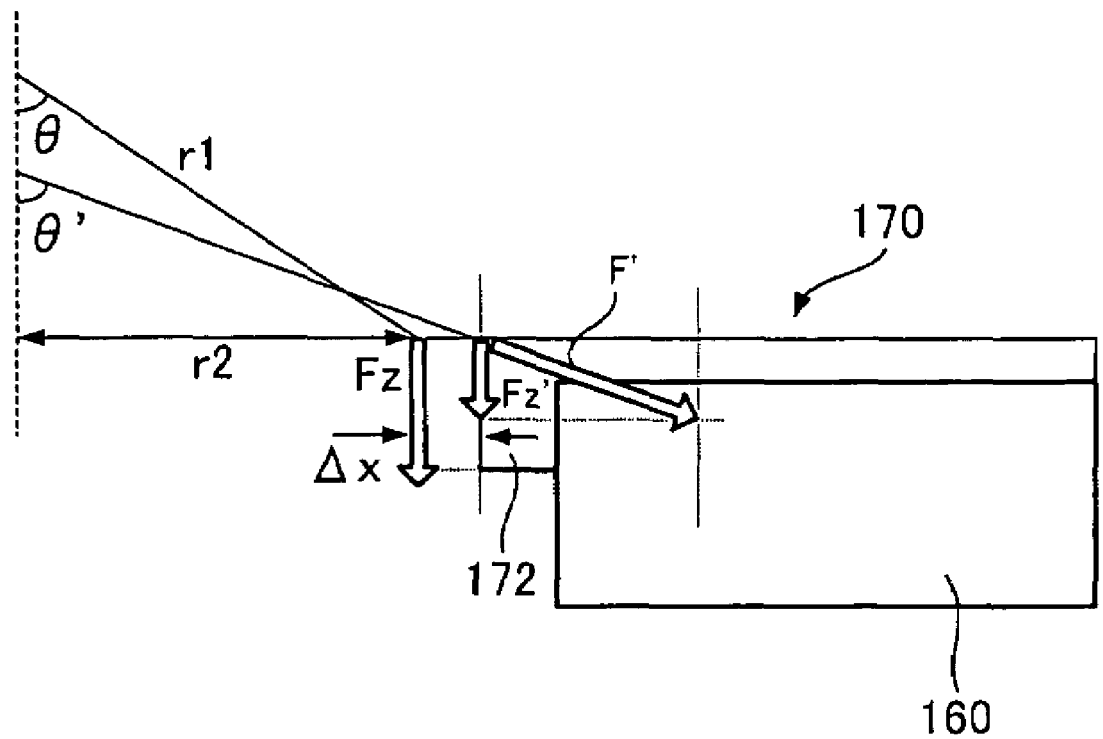
FIG. 7 is a view analyzing the state of a spacer by means of vectors after the spacer is caulked to the carriage arm having a through hole with a projecting space shown in FIG. 3.

FIG. 7 is a view analyzing the state of a spacer by means of vectors after it is caulked to a carriage arm having a through hole with the projecting space shown in FIG. 3.

A part of a boss section 172, which is plastically deformed when the spacer 170 is caulked to the carriage arm 160, escapes into the projecting space 1620 shown in FIG. 3 and is displaced in the radial direction of a path 173 by Δx. Accordingly, the projecting space 1620 shown in FIG. 3 is equivalent to an example of an escape portion of the present invention.

When the part of the boss section 172 is displaced in the radial direction of the path 173 by Δx, a force Fz' of the caulking ball 550 applied to the boss section 172 in the passing-through direction is shown by Expression 2.

$$Fz' = F' \times \cos\theta' = F0 \times \cos^2\theta' \quad \text{Expression 2}$$

Note that $\cos\theta' = \{r1^2 - (r2+\Delta x)^2\}^{1/2}/r1$.

Accordingly, Expression 3 is derived from Expressions 1 and 2.

$$Fz' = Fz \times \cos^2\theta'/\cos^2\theta = Fz \times \{r1^2 - (r2+\Delta x)^2\}/(r1^2 - r2^2) \quad \text{Expression 3}$$

Figure 8:
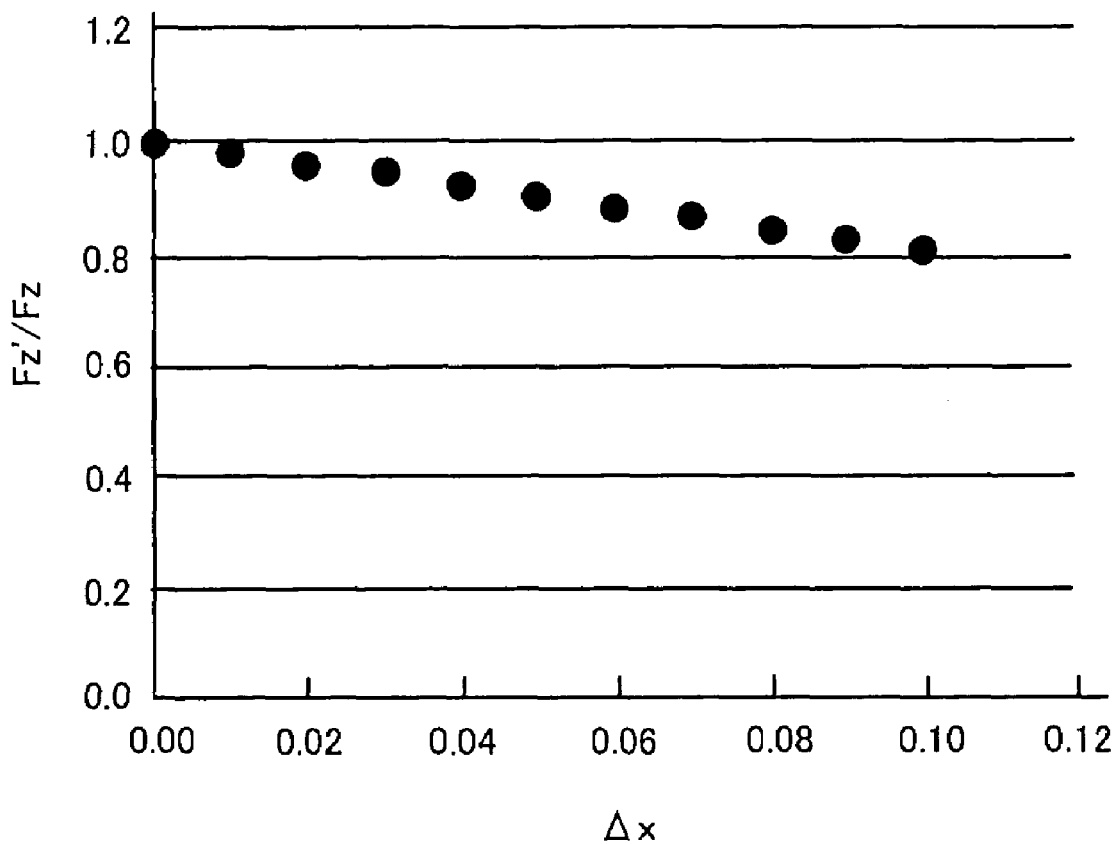
FIG. 8 is a graph showing the relation between $Fz'/Fz$ and $\Delta x$.

FIG. 8 is a graph showing the relation between Fz'/Fz and Δx.

The relation shown in FIG. 8 is a relation when the spacer having the path 173 whose radius is 90% of the radius of the caulking ball 550 is caulked to the carriage arms 160. In the graph shown in FIG. 8, a horizontal axis shows Δx (unit: mm), and a vertical axis shows the value of Fz'/Fz derived from Expression 3.

As can be seen from the graph shown in FIG. 8, an increase in Δx decreases the value of Fz'/Fz. In the graph, Δx is equivalent to the amount of projection of the projecting space 1620 shown in FIG. 3 when it projects toward the extreme end of the carriage arm 160. Accordingly, it can be found that an increase in the amount of the projection of the projecting space 1620 projecting toward the extreme end of the carriage arm 160 decreases the force of the caulking ball 550 applied to the boss section 172 in the passing-through direction. A decrease in the force of the caulking ball 550 applied to the boss section 172 in the passing-through direction suppresses a large amount of plastic deformation of the boss section 172 in the passing-through direction of the caulking ball 550. Moreover, since the projecting space 1620 shown in FIG. 3 is a space projecting in the extending direction of the suspension arms 150, it can be securely suppressed that the extreme end of the sheet member 171 constituting the spacer 170, to which the suspension arm 150 is attached, is pulled in the passing-through direction of the caulking ball 550. As a result, it can be prevented that the suspension arm 150 inclines and the extreme end thereof is raised.

Next, a modification of the embodiment will be explained, wherein the same components as those described up to now are denoted by the same reference numerals. In the modification described below, the shape of the through hole 162 is varied.

Figure 9:
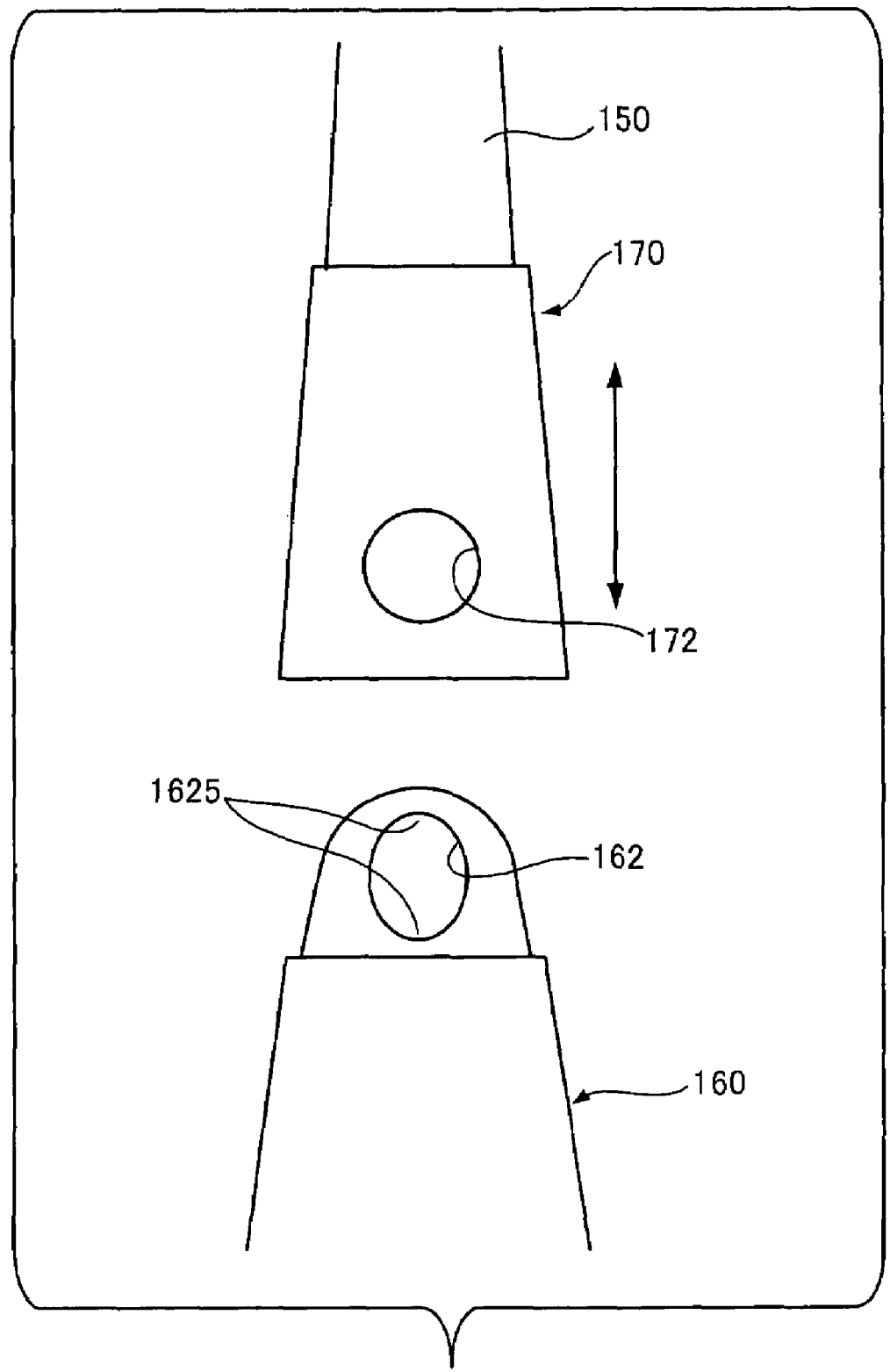
FIG. 9 is a view schematically showing a carriage arm having an elliptic through hole, and a spacer shown in FIG. 3.

FIG. 9 is a schematic view showing a carriage arm having an elliptic through hole, and a spacer shown in FIG. 3.

FIG. 9 shows a part of suspension arms 150 extending in the lengthwise direction of the spacers 170 (refer to an arrow in FIG. 9). The carriage arm 160 shown in FIG. 9 has the elliptic through hole 162 formed therethrough. The through hole 162 has a minor axis slightly larger than the outside diameter of a boss section 172 disposed to the spacer 170, and the lengthwise direction of the spacer 170 attached to the carriage arm 160 is in agreement with the major axis direction of the through hole 162. When the boss section 172 is inserted into the through hole 162 shown in FIG. 9, gaps 1625 are formed on the both sides of the boss section 172 in the major axis direction. When the spacer 170 is caulked to the carriage arm 160, a part of the plastically deformed boss section 172 escapes into the gaps. Accordingly, both the side portions 1625 of the through hole 162 in the major axis direction shown in FIG. 9 is equivalent to an example of the escape section of the present invention.

Figure 10:
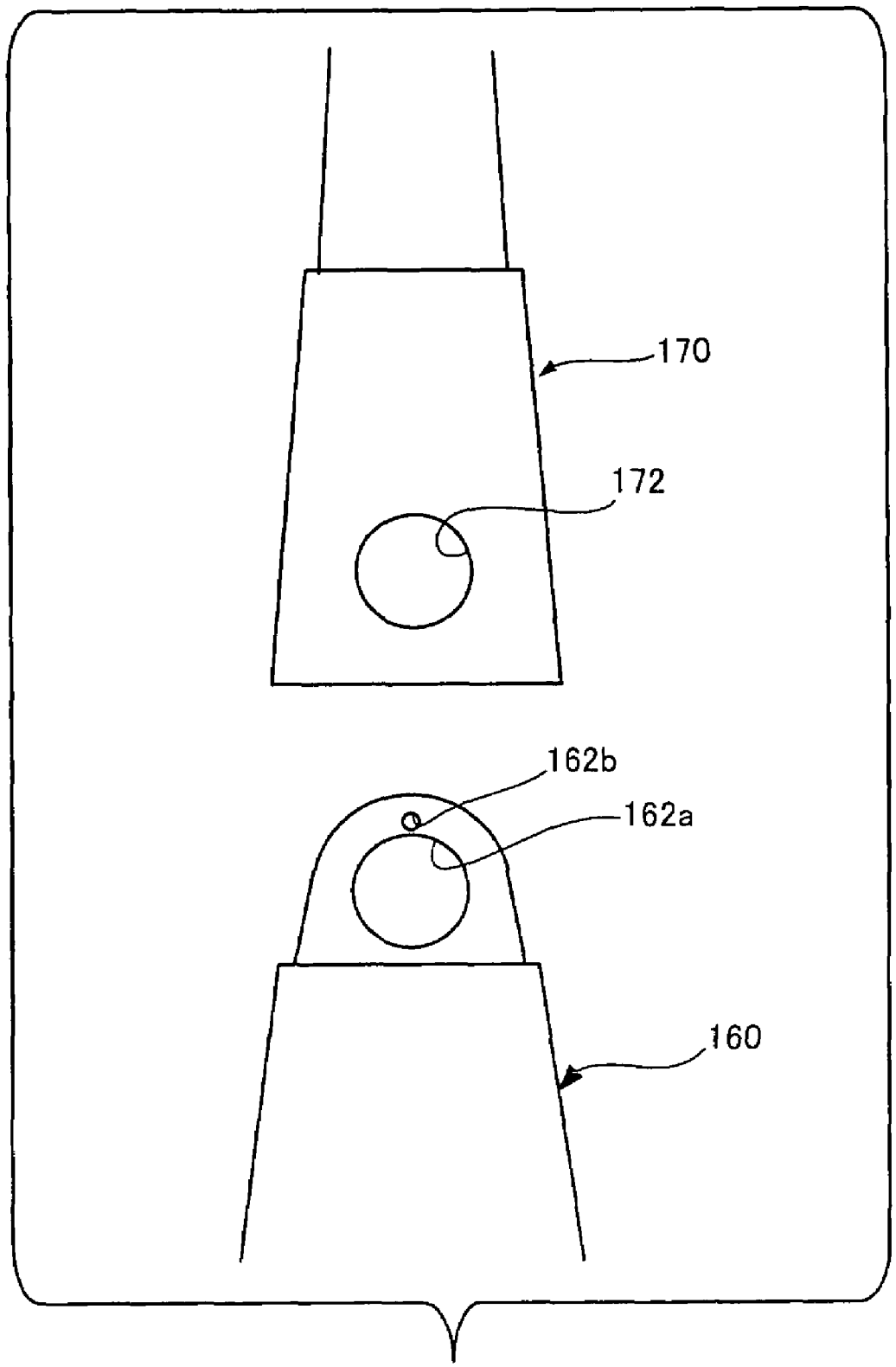
FIG. 10 is a view schematically showing a carriage arm having two through holes, and a spacer shown in FIG. 3.

FIG. 10 is a schematic view showing a carriage arm having two through holes, and a spacer shown in FIG. 3.

The carriage arm 160 shown in FIG. 9 has the two perfectly circular through holes 162a and 162b which are formed adjacent to each other in the lengthwise direction of the spacer 170 attached to the carriage arms 160. The diameter of the through hole 162a, which is apart from the extreme end of the carriage arm 160, is slightly larger than the outside diameter of a cylindrical boss section 172, and the diameter of the through hole 162b, which is near to the extreme end of the carriage arm 160, is greatly smaller than the outside diameter of the boss section 172. The boss section 172 is inserted into the through hole 162a having the large diameter. When a caulking ball passes through a path of the spacer, the portion between both the through holes 162a and 162b is broken, thereby the through hole 162a is integrated with the through hole 162b. That is, the through holes 162a and 162b are formed in a shape similar to that of the through hole 162 shown in FIG. 3. As a result, a part of the plastically deformed boss section 172 escapes into the through hole 162b having the small diameter.

Although the above explanation is made as to the hard disc drive 100 as an example, the base member of the present invention can be widely applied to any member to which an attachment member is caulked. Further, the projecting direction of the projecting space 1620 shown in FIG. 3 and the major axis direction of the elliptic through hole 162 shown in FIG. 9 are not limited to the lengthwise direction of the attachment member.

What is claimed is:

1. A base member having a relatively large thickness to which an attachment member is attached, the attachment member being composed of a relatively thin sheet member which has a cylindrical boss section projecting from a surface of the sheet member and which has a path passing through the sheet member and reaching the extreme end of the boss section, the base member comprising:
    a through hole which passes therethrough in the thickness direction thereof and into which the boss section is inserted,
    wherein the attachment member is caulked to the base member by plastically deforming the boss section by causing a spherical body whose diameter is larger than that of the path to pass through the path in the state that the boss section is inserted into the through hole;
    the through hole has an escape section into which a part of the boss section, which is plastically deformed when the attachment member is caulked to the base member, escapes in the radial direction of the path; and
    the through hole and the escape section form an opening whose circumference is closed, and the opening is longer in a longitudinal direction of the base.

2. A base member according to claim 1, wherein the through hole is a hole having such a shape that a large circle whose diameter corresponds to the outside diameter of the boss section overlaps a small circle whose diameter is smaller than that of the large circle so that the arc of the large circle intersects the arc of the small circle, and the portion of the small circle which is located outside of the large circle acts as an escape section.

3. A base member according to claim 1, wherein the through hole is an elliptic through hole, and both the ends of the elliptic through hole in the major axis direction thereof act as escape sections.

4. A base member according to claim 1, wherein:
    the base member is a carriage arm whose extreme end turns along a surface of a predetermined information storage medium using the rear end thereof as a fulcrum by receiving a drive force from an actuator; and
    the attachment member is a spacer to one end of which the rear end of a suspension arm is attached in the lengthwise direction of the spacer and the other end of the spacer is attached to the extreme end of the carriage arm, the suspension arm having a magnetic head disposed at the extreme end thereof to execute at least any one of recording and reproducing of information to and from the predetermined information storage medium.

5. A base member according to claim 4, wherein the through hole has a projecting space projecting from the circle whose diameter corresponds to the outside diameter of the boss section toward the extreme end of the carriage arm, and the projecting space acts as the escape section.

6. A base member according to claim 5, wherein the through hole is an elliptic through hole whose major axis direction is in agreement with the lengthwise direction of the spacer attached to the carriage arm, and both the sides of the elliptic through hole in the major axis direction thereof act as the escape sections.

7. An information storage apparatus comprising:

a magnetic head that executes at least any one of recording and reproducing of information to and from a predetermined information storage medium;

a suspension arm that holds the magnetic head such that the magnetic head approaches or comes into contact with the information storage medium;

a carriage arm that moves along a surface of the information storage medium by receiving a drive force from an actuator; and a spacer whose one end is attached to the suspension arm as well as the other end thereof is attached to the carriage arm, the spacer having a cylindrical boss section projecting from a surface of a sheet member whose thickness is smaller than that of the carriage arm and having a path passing through the sheet member and reaching the extreme end of the boss section, wherein the carriage arm has a through hole which passes therethrough in the thickness direction thereof and into which the boss section is inserted;

when the spacer is attached to the carriage arm, the spacer is caulked to the carriage arm by plastically deforming the boss section by causing a spherical body whose diameter is larger than that of the path to pass through the path in the state that the boss section is inserted into the through hole;

the through hole has an escape section into which a part of the plastically deformed boss section escapes in the radial direction of the path when the spacer is caulked to the carriage arm; and the through hole and the escape section form an opening whose circumference is closed, and the opening is longer in a longitudinal direction of the base.

* * * * *

UNITED STATES PATENT AND TRADEMARK OFFICE
CERTIFICATE OF CORRECTION

PATENT NO.         : 7,595,961 B2
APPLICATION NO.    : 11/018537
DATED              : September 29, 2009
INVENTOR(S)        : Shimozato It is certified that error appears in the above-identified patent and that said Letters Patent is hereby corrected as shown below:

In the Claims:

Col. 8, line 25, delete "an" and insert --only one--.

Col. 10, line 10, delete "an" and insert --only one--.

Signed and Sealed this

Sixth Day of April, 2010

David J. Kappos
*Director of the United States Patent and Trademark Office*